United States Patent [19]

Sikaffy

[11] Patent Number: 5,397,516
[45] Date of Patent: Mar. 14, 1995

[54] PROCESS FOR MAKING BUILDING PANELS

[75] Inventor: Faiz Sikaffy, Miami, Fla.

[73] Assignee: Thermo Cement Engineering Corp., Charlestown, Br. Indian Ocean Ter.

[21] Appl. No.: 36,700

[22] Filed: Mar. 25, 1993

[51] Int. Cl.$^6$ .................. B28B 1/14; B28B 1/50; B28B 1/52
[52] U.S. Cl. .................. 264/42; 106/672; 106/711; 264/234; 264/333; 264/336; 264/345; 264/DIG. 43
[58] Field of Search .................. 264/234, 345, 42, 333, 264/336, DIG. 43; 106/672, 711

[56] References Cited

U.S. PATENT DOCUMENTS

| | | | |
|---|---|---|---|
| 1,773,000 | 8/1930 | Huber | 264/31 |
| 2,119,860 | 6/1938 | Henderson | 263/336 X |
| 3,177,281 | 4/1965 | Umansky | 264/42 |
| 3,236,925 | 2/1966 | Urmston | 264/42 |
| 3,679,445 | 7/1972 | Howe | 264/333 X |
| 3,808,299 | 4/1974 | Svensson | 264/42 |
| 4,067,939 | 1/1978 | Lowe et al. | 264/42 |
| 4,124,669 | 11/1978 | Urmston | 264/333 X |
| 4,132,555 | 1/1979 | Barrable | 106/711 X |
| 4,341,561 | 7/1982 | Britt et al. | 106/672 X |
| 4,376,086 | 3/1983 | Schubert et al. | 264/333 X |
| 4,401,471 | 8/1983 | Eckardt et al. | 106/672 |
| 4,422,989 | 12/1983 | Hams et al. | 264/333 X |
| 4,655,979 | 4/1987 | Nakano et al. | 264/234 X |

FOREIGN PATENT DOCUMENTS 2739181 3/1979 Germany .................. 264/42
365339 2/1973 U.S.S.R. .................. 264/71

OTHER PUBLICATIONS

"The Clay Worker", "Ferric Chloride as a Coagulant", Aug. 1929, Carey P. Ellis, p. 127.

Primary Examiner—Karen Aftergut
Attorney, Agent, or Firm—Malloy & Malloy

[57] ABSTRACT

A process of molding a building panel which includes the steps of combining about 25 pounds of Portland Cement Type I, about 15 pounds of water at around 21° Centigrade, added about 1 ounce of aluminum, calcium, magnesium, and silica, respectively, and about 12 ounces of synthetic fibers with about 0.1 ounce of ferro chloride in 40% solution by volume, and pouring the mixture into the lower portion of a mold to about ½ its depth and waiting for approximately 4 hours for the mixture to increase by about 100% of its original volume to fill the mold and thereafter stripping the mold from the form and placing it in a heated environment for curing for a period of approximately 24 hours and thereafter removing the panel from the heated environment. The panels according to the process are preferably provided with a peripheral groove in the side and upper surfaces so that when placed in generally co-planar relation, a cavity is defined between adjacent panels in which there is a steel reinforcing rod embedded in a pour of concrete to form a wall.

1 Claim, 2 Drawing Sheets

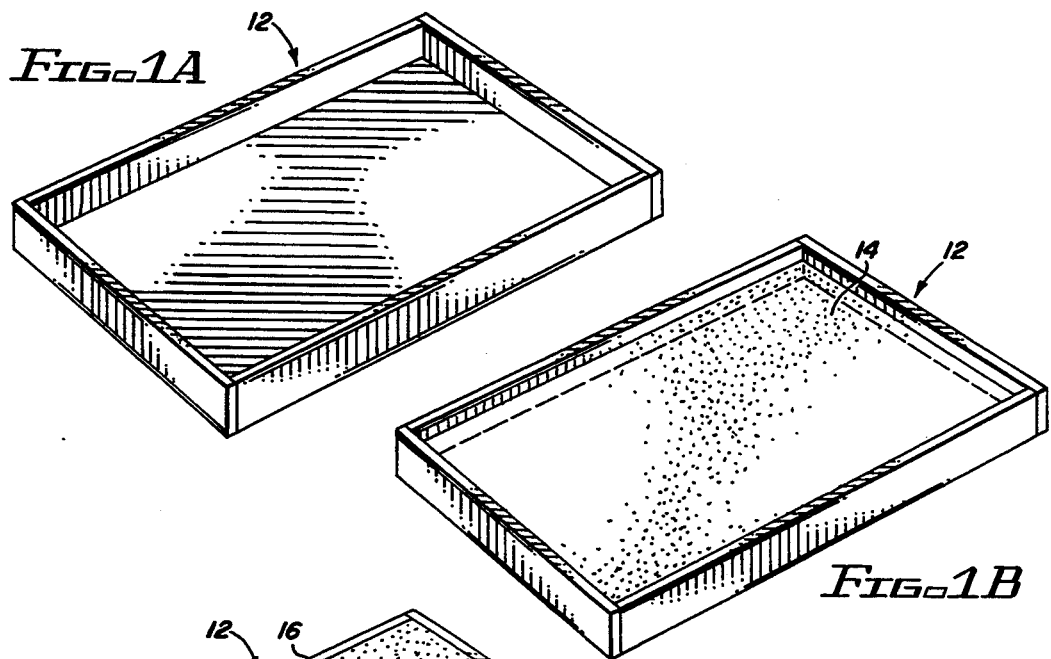
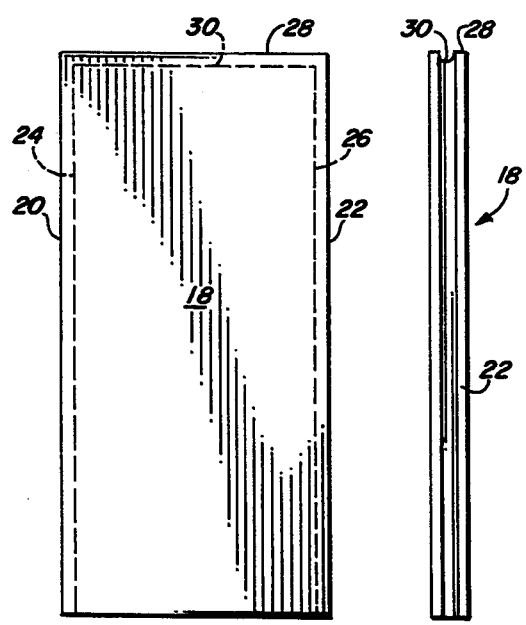
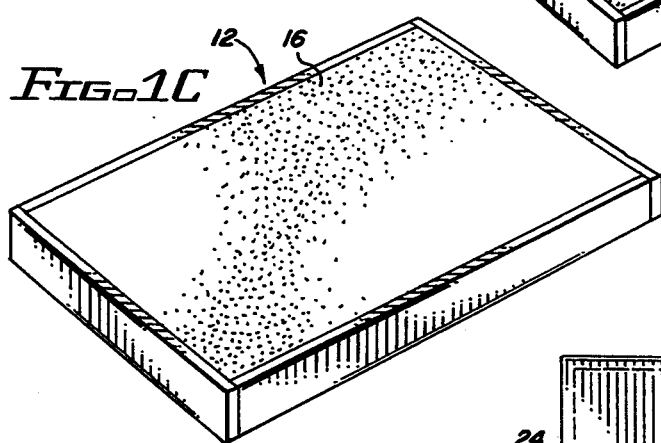
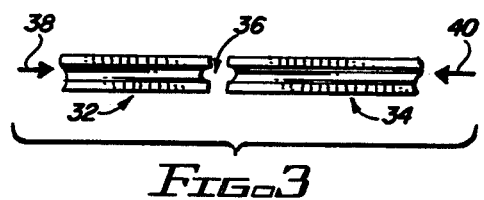

PROCESS FOR MAKING BUILDING PANELS

FIELD OF THE INVENTION

This invention is of a method or process or making a cementitious building panel which is very strong, yet light in weight, of a panel made according to the process, and of a construction utilizing the panel.

SUMMARY OF THE INVENTION

In the past, it has been known to form various types of panels of cementitious material, including building wall sections and blocks, and to assemble walls from these. Some panels formed of such materials are made of a mixture which includes some solid additives as well as Portland cement and synthetic fibers.

This invention in one form is of a process which it has been found produces a cellular cement which is light in weight and highly resistant to impacts. Its structure is formed by spherical cells distributed in the mass of its mixture. Surrounding each cell, synthetic fiber, that is added to the mixture, results in a panel with a very strong flexing strength characteristic. Another important characteristic of the panel according to the process described below is that it has a high thermo resistance with an "R" value of about 3.5 per inch of thickness. It further has the characteristic of high acoustic insulation. It is an excellent fire barrier; and it is light in weight and can be manufactured with a weight preferably of between 22 and 32 pounds per cubic foot. Moreover, a panel according to this invention is highly impermeable to the elements.

DESCRIPTION OF THE PREFERRED EMBODIMENT

Figure 4:
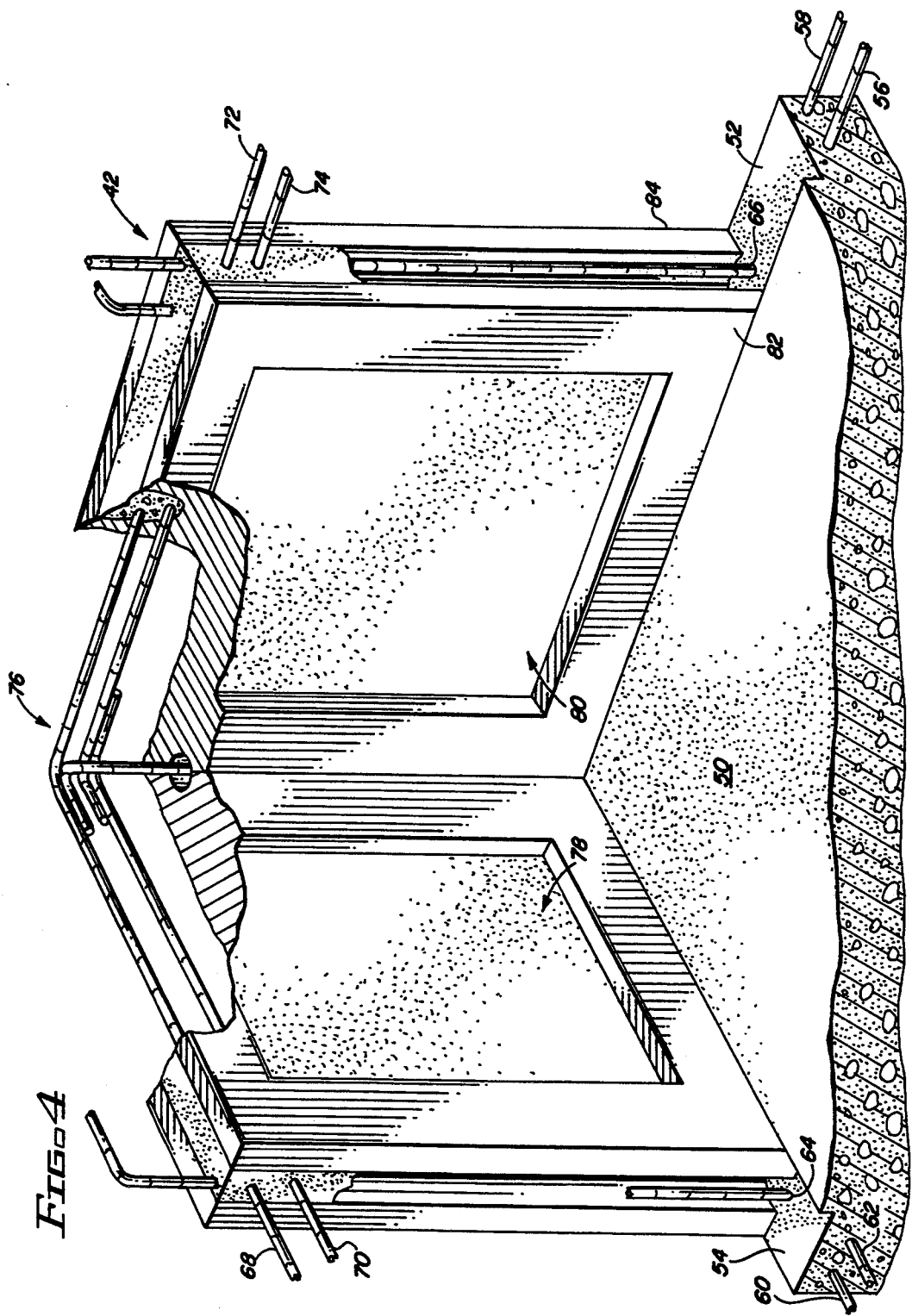

With the formula to be described hereinafter, a mold or form 12 is used, see FIG. 1A, which is about 4" to 8" in thickness so as to make a panel about 4 feet wide by 4 to 12 feet in height. In performing the process, the ingredients are poured into the mold whereupon in about four hours, the mixture 14 which is only about half of the depth of the mold, see FIG. 1B, expands by about 100% of the original pour volume, see FIG. 1C, to form a panel 16. Molds or forms may be utilized to form wall panels or building blocks according to this invention. Gradually, initial adjustments of the pour of the mixture are made so that on completion of the pour expansion phase, the building panels are of uniform and correct size.

The quality control of the process is quite easily attained. When the formula is correct and the mold is filled to substantially one-half the depth of the mold, FIG. 1B, it will be properly filled. If on completion it does overflow or does not fill the form, it is very easy on a quality control basis, to detect a defective panel and reject it.

As an example to further understand the process, a panel of a density of about 32 pounds per cubic foot is formed by first, mixing about 25 pounds of Portland Cement, Type I together with water, at about 21° Centigrade temperature, in an amount of about 15 pounds and, in addition, adding synthetic fibers in an amount of about 12 ounces and a combination of Aluminum-Calcium-Magnesium-Silica in a total amount of about 1 ounce and also about 0.1 ounce of ferric chloride in 40% solution.

Referring now to FIGS. 2A, 2B, and 2C, which illustrate a panel in one preferred configuration or form, it is seen that the panel 18 and, accordingly, the mold in which it is formed is of a rather particular configuration. Along the sides 20 and 22, a centrally located longitudinally extending generally U-shaped groove, see 24 and 26, is defined; and along the upper surface 28, a similar groove 30 is defined. In assembly, a wall section as seen in FIG. 3, is formed by positioning two panels 32 and 34 which have been raised adjacent one another and a steel rod 36 has been positioned centrally between them. The panels are then moved into abutting relation as indicated by the arrowed lines 38 and 40. Thereafter, when the central location of the rod has been secured by wire, as is conventional, a pour of concrete or other suitable material is poured into the tubular cavity surrounding the reinforcing rod 36. This pour forms a labyrinth seal while the steel rod provides reinforcement of the wall.

Referring now to FIG. 4, a construction according to this invention will be described referring to a corner zone of the construction, in this illustration. In an initial summary of this invention, it will be seen that a skeletal framework, generally designated 42, is embedded in concrete and is spanned by building panels according to this invention.

On further reference to FIG. 4, on a concrete slab 50, which may have a peripheral footing, not shown, there is preferably a peripheral lower slab portion, see at 52 and 54. This is about 7⅝" across or about 8". Beneath this portion, steel reinforcing rods, such as 56 and 58 and 60 and 62, are embedded in the concrete of the slab. Also extending upwardly at spaced locations, there are reinforcing rods such as 64 and 66 which in assembly will be steel studs in the center of the U-shaped grooves of adjacent panels, described above.

Along the upper edges of the panels, steel reinforcing rods, such as 68 and 70 and 72 and 74 are arranged. At the corner zone, 76 generally, the ends of the rods are bent into close abutting relation as seen at 76. Preferably, the rods are welded together which in effect defines a skeletal framework of steel reinforcing rods embedded in concrete lengths spanned by cementitious panels such as 78 and 80 in FIG. 4, preferably made according to the process of this invention. To the inside and outside surfaces of the structure thus formed, a suitable facing may be provided as at 82 and 84 which may be drywall on the inside surface and stucco on the outside surface.

Instead of the building panel shown in the drawings, blocks configured with the U-shaped grooves along their edges and the top of the top most block may be assembled and utilized as described above.

Thus, there has been described a process for making a building panel or block and panels of a preferred mating configuration to be assembled with a skeletal framework of steel which is embedded in reinforced concrete. This type of structure has been found to have an insulation coefficient of R 4 per inch, responds to compressive forces of up to 900 p.s.i., has a tensile resistance of 800 p.s.i., a sound resistance of 300 Hz, and which weighs less than about 40 pounds per cubic foot.

While these inventions have been described in practical and preferred embodiments, it is recognized that departures may be made within the spirit and scope of these inventions which should, therefore, not be limited except as set forth in the following claims and within the doctrine of equivalents.

What is claimed is:

1. The process of making in a mold about 4" to 8" in depth a lightweight, cementitious panel comprising the steps of:
   (a) measuring about 25 pounds of Portland Cement Type I, about 15 pounds of water, about one ounce total of a combination of aluminum, calcium, magnesium and silica, about 12 ounces of synthetic fibers, and about 0.1 ounce of ferric chloride in 40% solution by volume;
   (b) heating said about 15 pounds of water to about 21° Centigrade;
   (c) combining said about 25 pounds of Portland Cement Type I and said about 15 pounds of water at about 21° Centigrade, and adding said about one ounce total of a combination of aluminum, calcium, magnesium, and silica and said about 12 ounces of synthetic fibers and said about 0.1 ounce of ferric chloride in 40% solution by volume thereto to form a mixture;
   (d) pouring said mixture into said mold to one-half of said depth of said mold;
   (e) waiting for approximately four hours for said mixture to increase by about 100% of its original volume thus filling an upper half of said mold to form a panel;
   (f) stripping said mold from said panel;
   (g) placing said panel in a heated environment for curing for a period of approximately 24 hours; and
   (h) removing said panel from said heated environment when cured.

* * * * *